United States Patent [19]
Larson

[11] Patent Number: 4,611,644
[45] Date of Patent: Sep. 16, 1986

[54] MANUAL AND AUTOMATIC TRACER LATHE

[76] Inventor: Robert W. Larson, 205 Dartmouth St., Warren, Pa. 16365

[21] Appl. No.: 672,195

[22] Filed: Nov. 16, 1984

[51] Int. Cl.[4] .............................................. B23B 3/28
[52] U.S. Cl. ........................................ 142/7; 82/14 R; 82/14 B; 142/49; 142/55
[58] Field of Search ................. 142/7, 55, 49; 82/2 B, 82/14 R, 14 A, 14 B, 14 C

[56] References Cited

U.S. PATENT DOCUMENTS

| | | | |
|---|---|---|---|
| 2,814,007 | 11/1957 | Lesher et al. | 82/14 B |
| 2,859,290 | 11/1958 | Grinage | 82/14 B |
| 2,884,025 | 4/1959 | Fales | 142/55 |
| 3,039,035 | 6/1962 | Rudolf | 82/14 B |
| 3,332,458 | 7/1967 | Baldwin | 142/7 |
| 3,674,063 | 7/1972 | Klingbeil | 82/14 C |
| 3,768,527 | 10/1973 | Messick | 142/7 |
| 4,491,162 | 1/1985 | Holdahl | 142/55 |

Primary Examiner—Francis S. Husar
Assistant Examiner—Jerry Kearns
Attorney, Agent, or Firm—Larson and Taylor

[57] ABSTRACT

A combination manual and automatic tracer lathe for cutting a work piece as disclosed. A cutting means for the work piece is movable longitudinally along the work piece and laterally movable into and out of engagement with the work piece while following a pattern. The pattern can be computer generated or mechanically generated with a pattern model. With either model, the cutting means is moved back and forth longitudinally along the work piece as successively deeper or new cuts are made in the work piece according to the model.

26 Claims, 11 Drawing Figures

TABLE MOUNTED CONTROL UNIT

HAND HELD CONTROL UNIT

MANUAL AND AUTOMATIC TRACER LATHE

FIELD OF THE INVENTION

The present invention realtes generally to machine tools, and more particularly to a manual or automatically operated tracer lathe.

SUMMARY OF THE INVENTION

In accordance with the present invention, a combination manual and automatic tracer lathe for cutting a work piece is provided. The tracer lathe includes a lathe base and a work holding means attached to the lathe base for holding and turning the work piece about a longitudinal axis. A cutting means is attached to the lathe base for cutting the turning work piece. This cutting means is longitudinally movable along the work piece by a longitudinal moving means. In addition, the cutting means is laterally movable into and out of engagement with the work piece by a lateral moving means as the cutting means is also moved longitudinally. The lateral moving means includes a manual advancing means which is used to incrementally advance the cutting means towards the work piece to an advanced position and an associated mechanical tracer means for tracing a pattern as the cutting means is moved longitudinally. The mechanical tracing means moves the cutting means laterally away from the work piece from the advanced position according to the pattern so that successively deeper or new cuts are made in the work piece according to the pattern on each longitudinal movement and lateral advance of the cutting means. A computer advancing means and a computer tracer means are also provided for automatically operating the tracer lathe. A selecting means is also provided for selecting between the manual advancing means and the computer advancing means.

In the preferred embodiment, the mechanical tracer means includes a longitudinal pattern model, a tracer head which is attached to the cutting means and which moves longitudinally with the cutting means while riding along the pattern model, and a connection means for moving the cutting means laterally as the tracer head is moved laterally by contact with the pattern model. The pattern model can be a cylindrical object with the desired pattern cut circumferentially therearound or a flat elongate object with the desired pattern cut along one longitudinal edge. With either pattern model, a suitable holding means is provided for the pattern model.

In the preferred embodiment, the manual advancing means is used to move the tracer head relative to the cutting means. Preferably, the cutting means includes a cutting tool, a cutting holder means for holding the cutting tool, and a cutting base. The mechanical tracer includes a tracer base on which the tracer head is mounted and a tracer mounting means for mounting the tracer base for lateral movement on the cutting base. The manual advancing means includes a manual motor means for selectively laterally moving the tracer base relative to the cutting base to move the tracer head relative to the cutting tool. Advantageously, the manual advancing means also includes a spring means for resiliently urging the cutting base toward the work piece until the tracer head engages the pattern model so that the tracer head is resiliently urged against the pattern model as the tracer head moves longitudinally with the cutting means. For best results, a constant bias on the tracer head is provided.

In the preferred embodiment, the lateral moving means also includes a cutting mounting means for mounting the cutting base for lateral movement relative to the lathe base. The computer advancing means then includes a computer motor means for selectively laterally moving the cutting base relative to the lathe base to cause movement of the cutting tool laterally relative to the workpiece. Preferably, the lateral moving means further includes a programmable computer means mounted on the lathe base for automatically controlling the operation of the computer advancing means and the computer tracer means. According to the preferred embodiment, the computer motor means includes a threaded rod which is rotated by the computer motor means relative to the base and an engagement means attached to the cutting base for selectively engaging the threaded rod to cause the cutting base to move relative to the lathe base. The engagement means is preferably a split nut which is movable into and out of engagement with the threaded rod.

For convenience, the lateral moving means preferably includes a handheld remote actuator for remotely actuating the manual advancing means and the longitudinal moving means. In addition, a transparent safety shield resting on the lathe base is provided to completely cover the work piece and associated elements.

Where the cutting means includes a cutting tool, a cutting holder means, and a cutting base, a cutting pivot means is also preferably provided for pivotally mounting the cutting holder means to the cutting base. In this manner, the rake of the cutting tool is adjusted by pivoting the cutting holder means about an axis parallel to the longitudinal axis of the work piece. Preferably, a cutting locking means is provided for locking the cutting tool in a desired rake position. A vacuum means is also conveniently provided for collecting work piece cuttings or chips and transporting these work piece cuttings or chips away from the remainder of the cutting means. A deflector plate is provided with a tip which is advantageously positioned adjacent the end of the cutting tool for deflecting the work cuttings or chips away from the end of the cutting tool and into the vacuum inlet. Chip guards are also preferably located above and below the cutting tool to stop flying chips cut from the work piece which may occur.

It is a feature of the present invention to provide a lathe which traces a pattern on a work piece from either a mechanical pattern model or a computer generated model.

It is also a feature of the present invention to provide a lathe which is totally enclosed by a safety shield but whose operation can be viewed.

It is an object of the present invention to provide a manual and automatic tracer lathe which is conveniently used as a teaching tool whereby students can manually trace a pattern or trace a pattern by programming a suitable computer.

It is a further object of the present invention to provide a lathe which is usable without tracing a model and which can be remotely controlled.

Other features and objects of the present invention are stated in or apparent from a detailed description of a presently preferred embodiment of the invention found hereinbelow.

DETAILED DESCRIPTION OF THE PREFERRED EMBODIMENT

Figure 1:
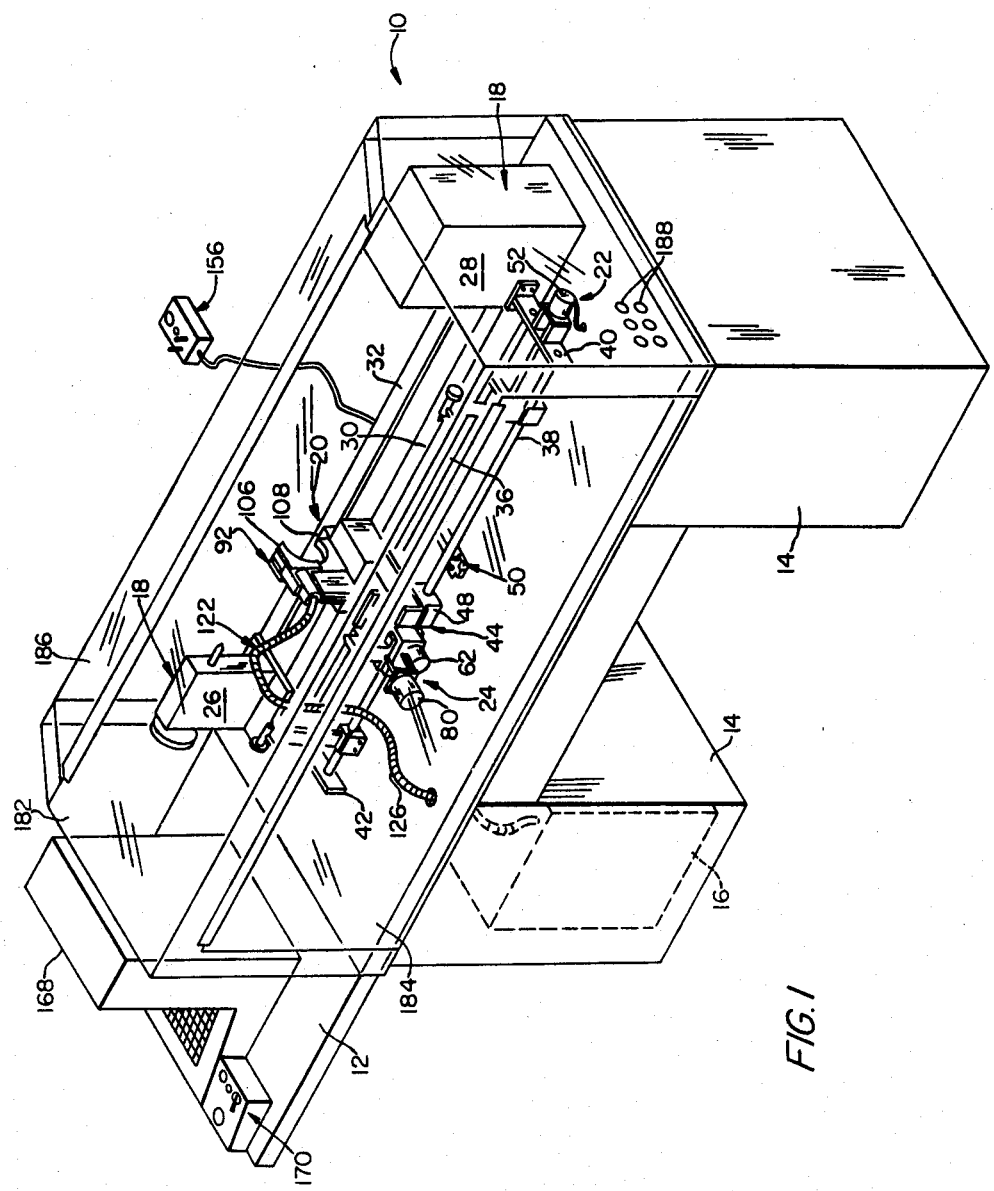
FIG. 1 is a perspective view of the manual and automatic tracer lathe according to the present invention.

With reference now to the drawings in which like numerals represent like elements throughout the several views, a combination manual and automatic tracer lathe 10 is depicted in FIG. 1. Tracer lathe 10 includes a lathe base 12 and legs 14. A suitable vacuum source 16 is mounted inside of one leg 14 as shown. As also shown in greater detail in FIG. 2, tracer lathe 10 includes a work holding means 18, a cutting means 20, a longitudinal moving means 22 for cutting means 20, and a lateral moving means 24 for cutting means 20.

Work holding means 18 includes end holders 26 and 28 which are conventionally mounted for movement upon holder rails 30 and 32. Holder rails 30 and 32 are integrally formed in lathe base 12. End holder 26 and 28 are used to mount a suitable work piece therebetween, such as cylindrical work piece 34 depicted in FIG. 3, for rotation. A means (not shown) for rotating work piece 34 is contained in end holder 28.

As mentioned above, tracer lathe 10 includes a longitudinal moving means 22 for moving cutting means 20 longitudinally, that is parallel to work piece 34 held between end holders 26 and 28. Longitudinal moving means 22 includes parallel guide rails 36 and 38 which are suitably attached to lathe base 12 by brackets 40 and 42, respectively. Cutting means 20 in slidably mounted for longitudinal movement on guide rails 36 and 38 by a suitable cutting mounting means 44. Cutting mounting means 44 includes a support 46 having four downwardly extending blocks 48 attached thereto. As shown best in FIG. 3, blocks 48 are suitably aperatured to receive one of guiderails 36 or 38 slidably therein. In order to provide additional support for guide rails 36 and 38, an intermediate support 50 can be provided as shown. In this manner, cutting means 20 is slidably mounted for longitudinal movement relative to work piece 34.

Figure 3:
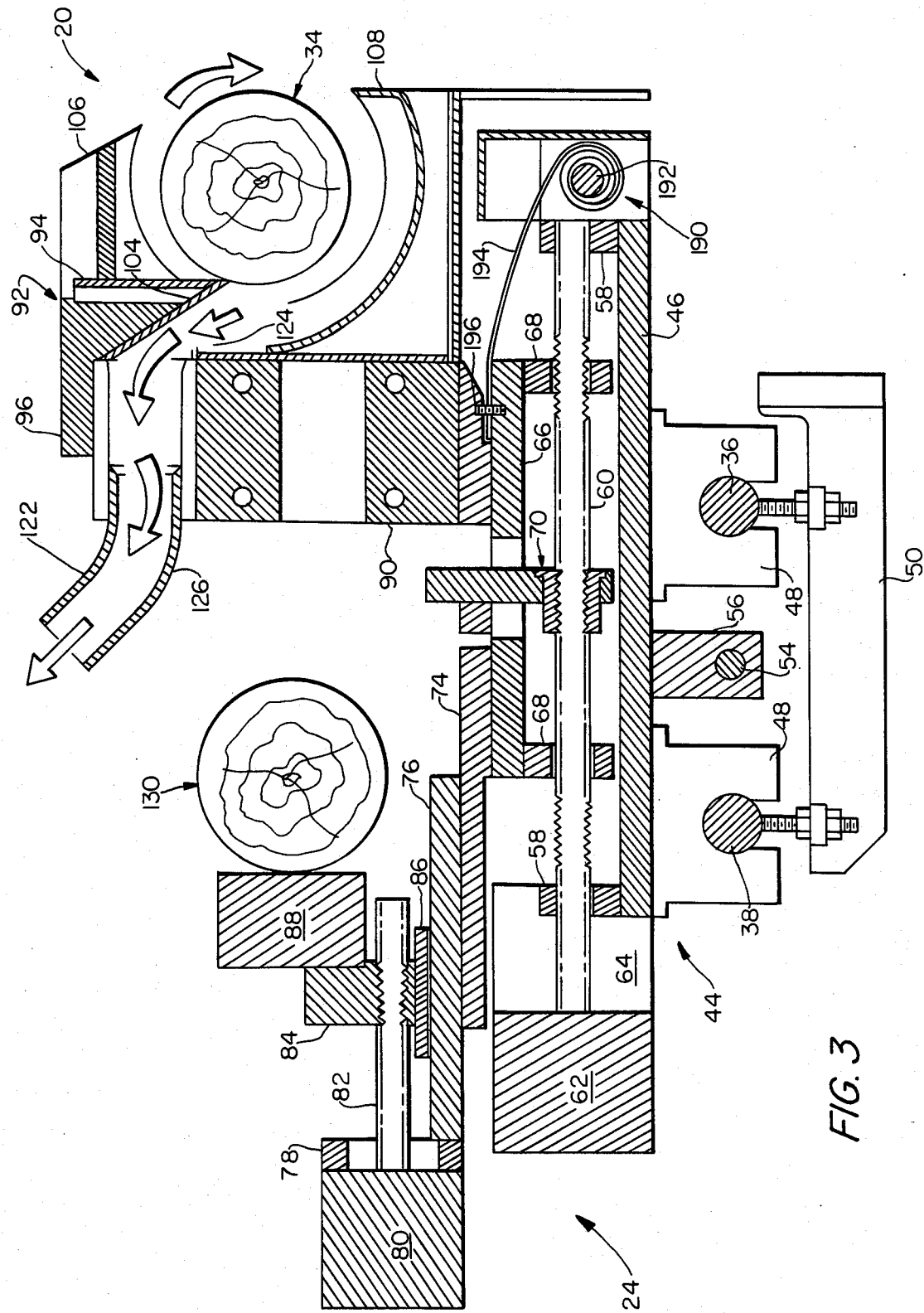
FIG. 3 is a cross-sectional side elevation view of the cutting device depicted in FIG. 1.

Longitudinal moving means 22 also includes a longitudinal motor means 52 which is used to reversibly rotate a threaded rod 54. Preferably, longitudinal motor means 52 is a stepper motor. Threaded rod 54 is mounted for rotation between guide rails 36 and 38 by brackets 40 and 42. As shown in FIG. 3, a split nut assembly 56 also depends from support 46 and threaded rod 54 passes threadably therethrough. Thus, upon rotation of threaded rod 54 by longitudinal motor means 52, support 46 and hence cutting means 20 is moved longitudinally along guide rails 36 and 38. The direction of movement of support 46 and cutting means 20 depends upon the direction of rotation of threaded rod 54. Thus, it should be appreciated that cutting means 20 can be moved back and forth along the longitudinal length of work piece 34 as desired by longitudinal moving means 22. It should further be appreciated that if it is desired to disconnect cutting means 20 from threaded rod 54, split nut assembly 56 can be moved out of engagement with threaded rod 54 so that cutting means 20 is thus easily moved by hand along rails 36 and 38.

Upstanding at each lateral end of support 46 are bearing members 58. Bearing members 58 support a threaded rod 60 for rotation. Threaded rod 60 is rotated by a computer motor 62 which is attached to support 46 by bracket 64. Preferably, computer motor 62 is a stepper motor. Bearing members 58 also support lateral guide rails 59 therebetween (shown in FIG. 11).

Located above threaded rod 60 is a table 66. Depending from the lateral ends of table 66 are guide blocks 68 through which guide rails 59 and threaded rod 60 slidably pass. A split nut assembly 70 also depends from table 66 to threadably engage threaded rod 60 and thereby couple table 66 for movement parallel to threaded rod 60 when threaded rod 60 is rotated by computer motor 62. During this movement, table 66 is constrained to parallel movement by guide rails 59. As shown best in FIG. 2, table 66 also includes a dust cover 72 to protect against jamming because of loose cuttings or the like.

Figure 2:
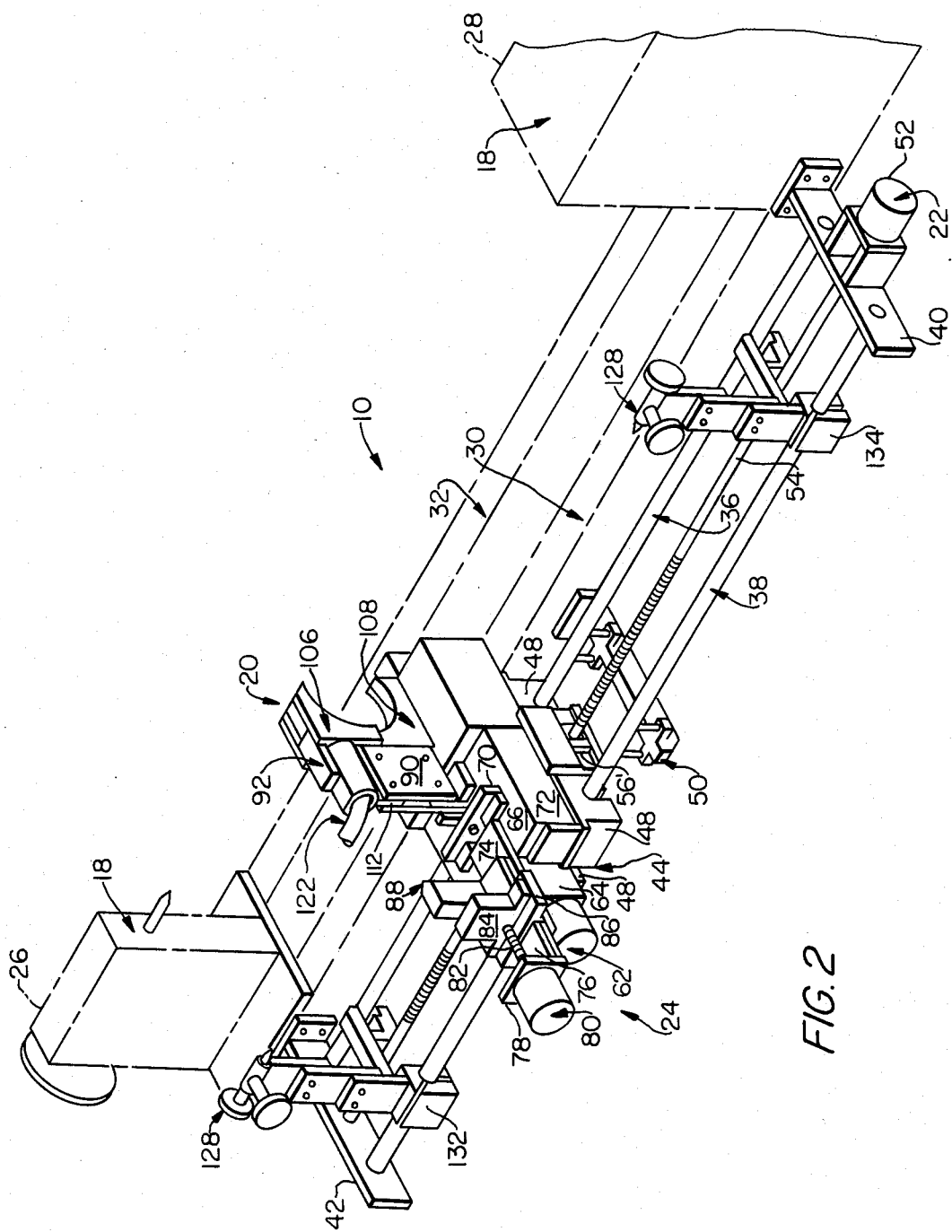
FIG. 2 is a perspective view of the cutting device and associated elements of the tracer lathe depicted in FIG. 1.

Attached at one lateral end of table 66 is a spacer plate 74. Mounted on spacer plate 74 is a guide table 76. As shown in FIG. 2, guide table 76 has notched longitudinal sides. Mounted on the end of guide table 76 by a bracket 78 is a manual motor 80. Manual motor 80 is preferably a stepper motor and is used to rotate a threaded rod 82 which extends laterally as shown. Threaded rod 82 engages a threaded block 84 which is attached to a sliding table 86. As shown in FIG. 2, sliding table 86 includes inturned edges which engage with the notches on the edges of tracer base 76. Mounted to threaded block 84 is a tracer head 88. By rotation of threaded rod 82 by manual motor 80, tracer head 88 is moved relative to tracer base 76 for a purpose to be discussed subsequently.

Figure 4:
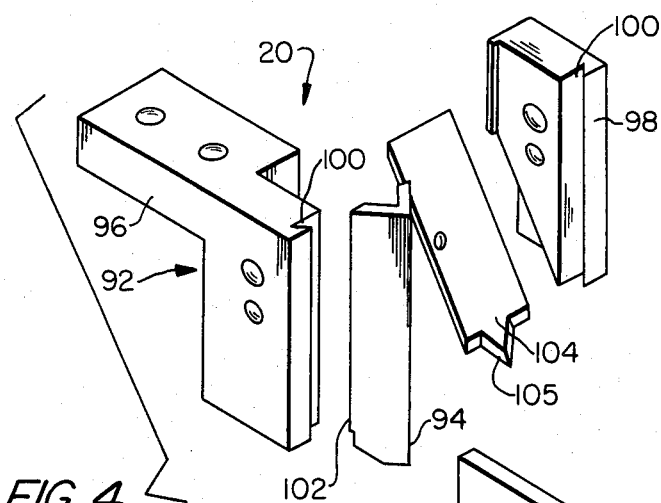
FIG. 4 is an exploded perspective view of the cutting means of the present invention.
Figure 5:
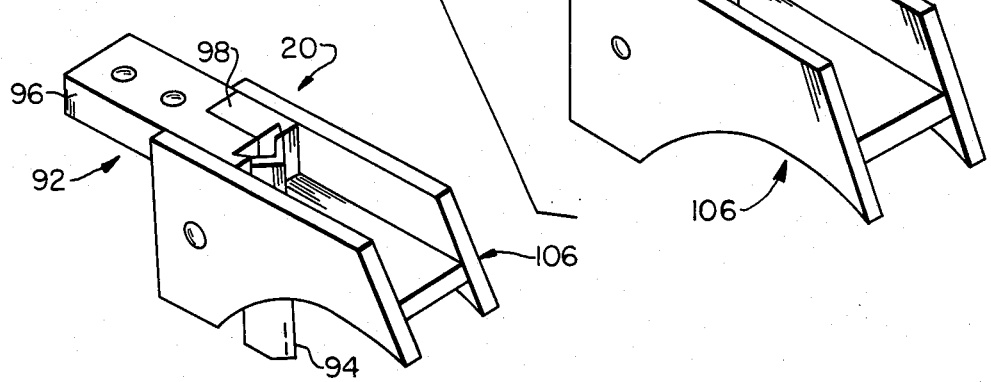
FIG. 5 is a perspective view of the assembled cutting means depicted in FIG. 4.

As shown in FIG. 3, cutting means 20 includes a cutting base 90 attached to table 66. Attached to cutting base 90 is a cutter holding means 92 depicted in greater detail in FIGS. 4, 5, and 6. Cutter holding means 92 is used to hold a cutting tool 94 for cutting work piece 34. Cutter holding means 92 includes two holder members 96 and 98 having angled grooves 100 therein which mate with corresponding edges 102 of cutting tool 94 to hold cutting tool 94 therebetween. A deflector plate 104 is also mounted between holder members 96 and 98. Deflector plate 104 includes an angled tip 105 which extends into the space immediately behind the cutting tip of cutting tool 94 to prevent any chips from getting into this space. A transparent top chip guard 106 is also attached to holder members 96 and 98. Preferably, top chip guard 106 is made of a transparent plastic material so that the cutting performed by cutting tool 94 can be viewed by the user. As shown in FIG. 3, a bottom chip guard 108 is also attached to cutting base 90. The attachment of the various elements of cutting base 90 is conveniently provided by screws or the like.

Figure 6:
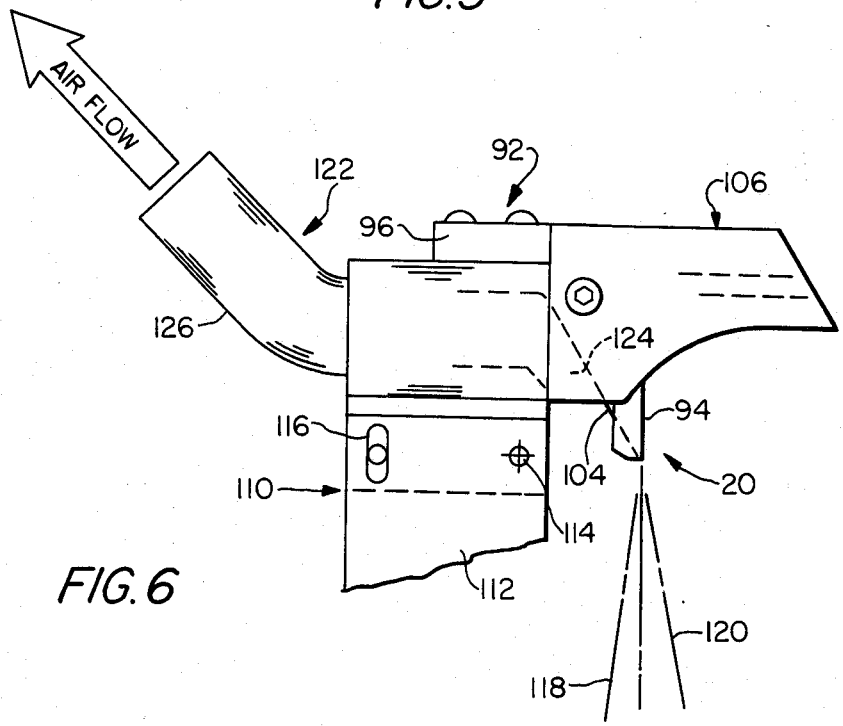
FIG. 6 is a side elevation view of the cutting means of the present invention and the pivot mounting therefor.

With reference to FIGS. 3 and 6, it should be appreciated that cutter holding means 92 is pivotally attached to cutting base 90 by a cutting pivot means 110. Cutting pivot means 110 includes a mounting plate 112 disposed centrally of cutting base 90 and attached to holder member 96. Mounting plate 112 includes a pivot aperature 114 in which a suitable pivot bolt is located to pivotally mount mounting plate 112 to cutting base 90. Mounting plate 112 also includes a pivot slot 116 in which a suitable bolt passes into cutting base 90. It should be appreciated that cutter holding means 92 is thereby pivotally mounted about an axis defined by pivot aperature 114. In addition, the tilting of cutter holding means 92 is limited by the ends of pivot slot 116 which contact the bolt received therethrough. In order to lock cutter holding means 92 in a desired position, the bolt passing through pivot slot 116 is tightened. In this manner, the rake of cutting tool 94 is easily adjusted from line 118 to line 120 as shown.

Cutting means 20 also includes a vacuum means 122 for collecting work piece cuttings and for transporting the work piece cuttings away from the remainder of cutting means 20. Vacuum means 122 includes a passage 124 between deflector plate 104 and bottom chip guard 108 to which a suitable vacuum hose 126 is attached as shown. It should be appreciated that cutter holding means 92 is specifically designed to make use of the natural path of travel of wood chips cut from workpiece 34 upwards and rearward from the tip of cutting tool 94 into passage 124. Thus, the wood chips are naturally funneled into passage 124 and are then removed to a collection point by vacuum means 122. Vacuum hose 126 is attached to vacuum source 16 located in the leg 14 of tracer lathe 10 as described above. Alternatively, vacuum hose 126 can be attached to an existing vacuum source external to tracer lathe 10 in which case vacuum source 16 would not be needed.

Figure 7:
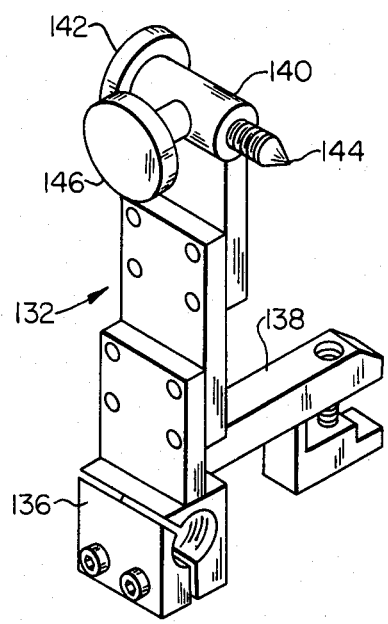
FIG. 7 is a perspective view of a pattern model holding means according to the present invention.
Figure 11:
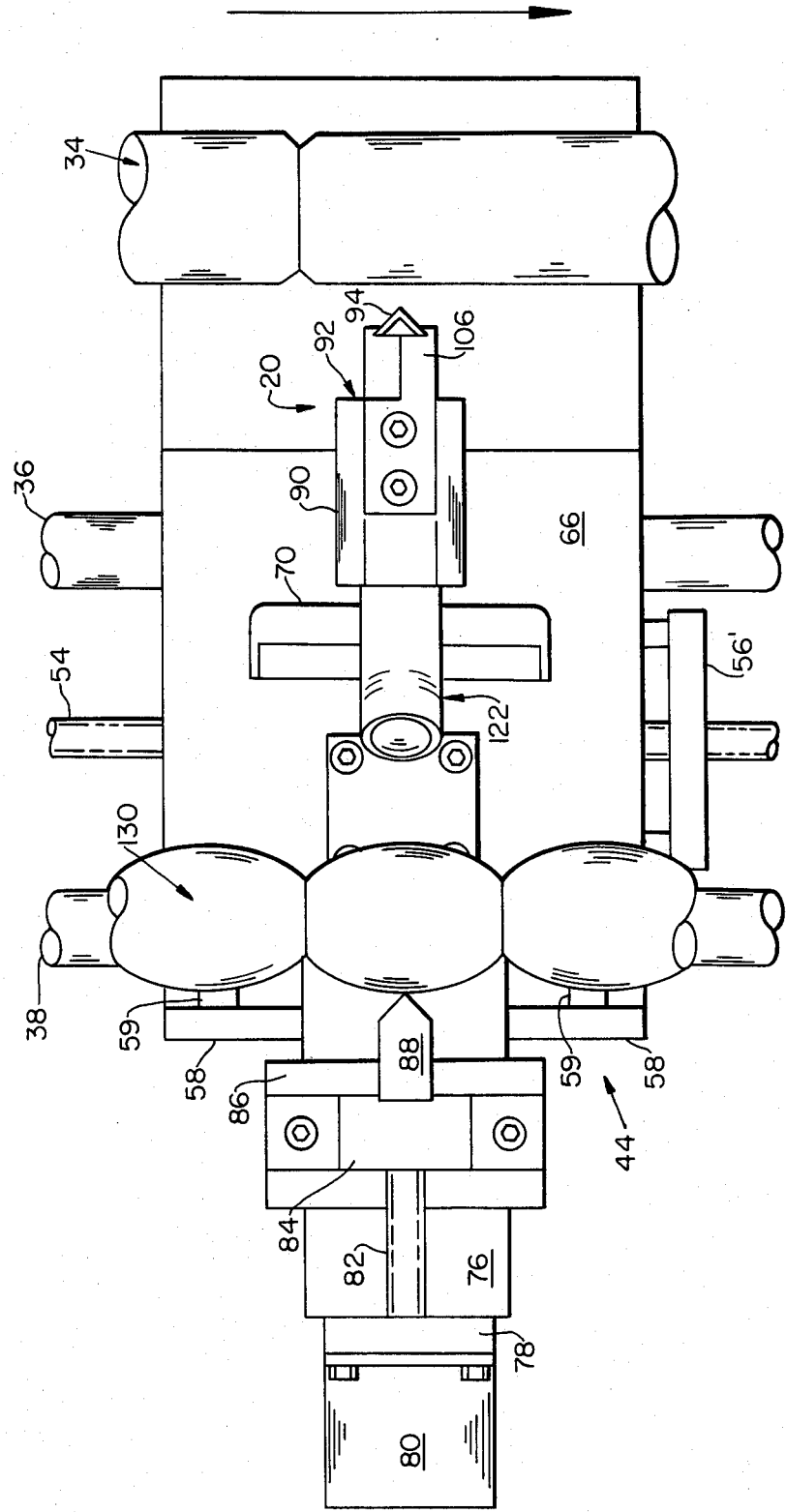
FIG. 11 is a top plan view of the cutting device in the mechanical mode of operation.

As shown in FIG. 2, a model holding means 128 is also provided for mounting a suitable pattern model 130 parallel to work piece 34. Model holding means 128 includes end members 132 and 134. End member 132 is shown in greater detail in FIG. 7. It should be appreciated that end members 132 and 134 are substantially identical and contain identical elements. End member 132 includes a split block 136 by which end member 132 can be securely attached to guide rail 38. By loosening the bolts passing through split block 136, split block 136 is easily slidable along guide rail 38. Attached to split block 136 is a brace 138 which engages guide rail 36. Brace 138 is slidable along guide rail 36. Upstanding from split block 136 is a threaded collar 140 in which a threaded bolt 142 is received having a point 144. Transverse to threaded bolt 142 is a lock bolt 146 locking threaded bolt 142 against rotation. As will be appreciated by those of ordinary skill in the art, pattern model 130 is cylindrical in shape and is mounted between threaded bolts 142 of end members 132 and 134 by threadably advancing points 144 into pattern model 130 at the radial center thereof. It should be appreciated that pattern model 130 is positioned by end members 132 and 134 so as to be disposed parallel to work piece 34 and adjacent tracer head 88 as shown in FIG. 11.

Figure 8:
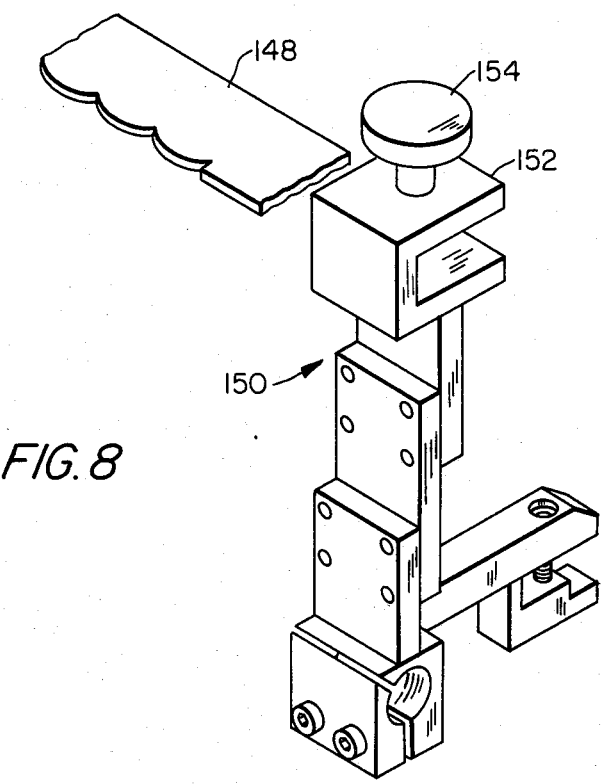
FIG. 8 is a perspective view of an alternative embodiment of a pattern holding means according to the present invention.

As an alternative to pattern model 130, a substantially elongate pattern model 148 can be used as depicted in FIG. 8. Where flat pattern model 148 is used, an alternative embodiment of end members 132 and 134 must be used such as end member 150. End member 150 is substantially the same as end member 132 with the exception that a U-shaped bracket 152 is provided in place of threaded collar 140. U-shaped bracket 152 includes a threaded bolt 154 through the top flange of U-shaped bracket 152. By advancing threaded bolt 154 into the center of U-shaped bracket 152, flat pattern model 148 located therein is clamped against the bottom flange of U-shaped bracket 152 by the flat end of threaded bolt 154.

Mounted at the end of support 46 is a spring means 190. Spring 190 includes a longitudinal shaft 192. A constant tension band spring 194 is wrapped around shaft 192 with one end of spring 194 attached to shaft 192. The other end of spring 194 is attached to a stop 196 which is trapped between table 66 and cutting base 90 as shown. By use of spring 194, a constant spring tension is exerted between support 46 and table 66 and hence by tracer head 88 on pattern model 130 regardless of the separation of tracer head 88 from spring means 190 or the position of tracer head 88 on tracer base 76.

Figure 9:
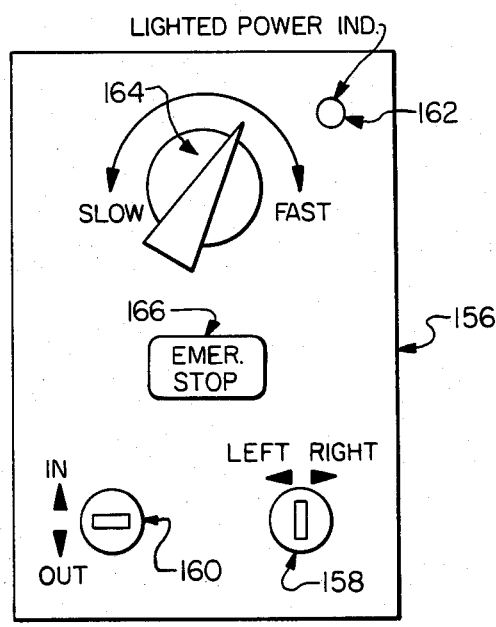
FIG. 9 is a top plan view of a manual control for the tracer lathe of the present invention.

The operation of longitudinal motor means 52 and manual motor 80 is conveniently provided by a handheld control 156 as shown in FIG. 1. The controls provided on handheld control 156 are shown in greater detail in FIG. 9. As shown, handheld control 156 includes a left-right toggle switch 158 which is used to control longitudinal motor 52 to turn threaded rod 54 in the appropriate direction to make cutting means 20 move in one direction or the other along guide rails 36 and 38. Handheld control 156 also includes and in-out toggle switch 160 which is used to control manual motor 80 to rotate threaded rod 82 in the appropriate direction to move tracer head 88 nominally toward or away from pattern model 130. In order to control the speed at which longitudinal motor means 52 and manual motor 80 operate, a speed control dial 164 is also provided. Conveniently, speed control dial 164 is connected to a suitable rheostat or the like. Finally, an emergency stop switch 166 is provided to turn off all power to tracer lathe 10 in emergency situations. A power on light is further provided on handheld control 156 so that the operator will know when handheld control 156 is powered.

Figure 10:
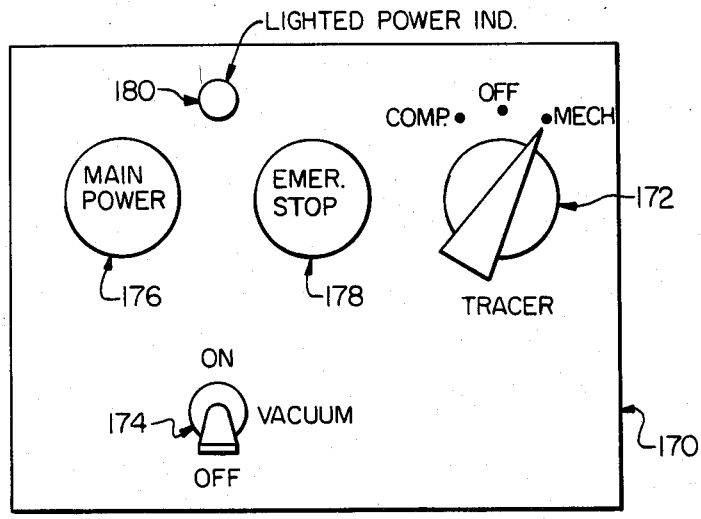
FIG. 10 is a top plan view of a computer console control for the tracer lathe of the present invention.

The operation of longitudinal motor means 52 and computer motor 62 is conveniently provided by a programmable computer 168 provided at one end of lathe base 12 as shown in FIG. 1. Computer 168 includes a computer control 170 which is depicted in greater detail in FIG. 10. Control 170 includes selector switch 172 for selecting control of tracer lather 10 between mechanical tracing using handheld control 156 and computer tracing using automatic control by computer 168. A vacuum on-off switch 164 and an emergency stop switch 178 are also provided. Control 170 further includes a main power on-off switch 176 and an associated power on light 180. Main power switch 176 controls power to all of the other switches in handheld control 156 and computer control 170, as well as to a lathe power on-off switch (not shown) located under lathe base 12 adjacent end holder 28.

For safety, work holding means 18, cutting means 20, longitudinal moving means 22, and lateral moving means 24 are enclosed by a transparent safety shield 182 attached to lathe base 12. In order to provide access to model holding means 128, a hinged door 184 is provided. Similarly, in order to provide access to work holding means 18, a hinged door 186 is provided. As vacuum means 122 draws air from inside of safety shield 182, suitable vents 188 are also provided in safety shield 182 at a position remote from cutting means 20 to prevent any chips or cuttings from passing through vents 188.

In operation, tracer lathe 10 functions in the following manner. Initially, work piece 34 is mounted in work holding means 18. The user then selects whether a mechanical or a computer tracing mode of operation is going to be used by appropriately moving selector switch 172.

With a computer tracing mode of operation, programmable computer 168 is appropriately programmed to actuate computer motor 62 to move cutting means 20 and cutting tool 94 into and out of engagement with work piece 34 at the appropriate longitudinal locations following a "computer model". This computer model can be custom designed by the user on the computer screen or can be selected from one of a number of design supplied in the computer memory. After this programming has been accomplished, vacuum switch 174 and the lathe switch are moved to the on positions and the working of work piece 34 commences.

The working of work piece 34 occurs as follows. Initially, cutting means 20 and in particular cutting tool 94 is positioned such that cutting tool 94 does not contact work piece 34 and is at a predetermined home position. Cutting means 20 is then moved to one longitudinal side of guide rails 36 and 38 by longitudinal motor means 52. Computer motor 62 is then actuated with knowledge of the diameter of work piece 34 to move cutting tool 94 until cutting tool 94 just misses work piece 34.

Once the initial position of cutting means 20 is achieved, longitudinal moving means 22 is actuated to move cutting means 20 longitudinally along guide rails 36 and 38. As cutting means 20 moves longitudinally, computer 168 actuates computer motor 62 to move cutting tool 94 into and out of engagement with work piece 34 a discrete distance. Initially, cutting tool 94 only cuts into work piece 34 at those points along work piece 34 which will be cut the deepest.

After completely traversing work piece 34, computer 168 reverses the direction of rotation of threaded rod 60 by reversing the direction of rotation of longitudinal motor means 52 to send cutting means 20 back along guide rails 36 and 38 in the opposite direction. As this occurs, computer 168 also causes computer motor 62 to advance cutting tool 94 into engagement with work piece 34 a second discrete distance at the lowest points previously cut, and at the first discrete distance along the next lowest points to be cut in work piece 34. At the end of travel of cutting means 20, computer 126 again reverses the direction of travel of cutting means 20 and causes cutting tool 94 to make new and deeper cuts at the appropriate points along work piece 34. This cycle of operation is then repeated until all of the appropriate points along work piece 34 have been cut to the appropriate depth.

It should be appreciated that as cutting tool 94 engages work piece 34, the cuttings such as wood chips are deflected by deflector plate 104 into the stream of air caused by vacuum means 122. In addition, chip guards 106 and 108 also prevent any stray chips from flying away from work piece 34 and cutting tool 104. The chips are conducted along vacuum hose 126 and appropriately collected.

When selector switch 172 of computer control 170 is switched from the computer tracing mode to the mechanical tracing mode, handheld control 156 is used to control the operation of tracer lathe 10. Initially, a pattern model, such as pattern model 130 depicted in FIG. 11, is mounted in appropriate end members 132 and 134 as described above. Next, tracer head 88 is moved to the lowest point on pattern model 130 and in-out switch 160 is moved until cutting tool 94 just contacts work piece 34. It should be appreciated that as in-out switch 160 is operated, sliding table 86 moves relative to tracer base 76 and hence table 66. However, due to the action of spring means 190, tracer head 88 is maintained in contact with pattern model 130 even though sliding table 86 moves relative to tracer base 76. Instead of moving tracer head 88, spring means 190 pulls table 66 towards work piece 34 which in turn moves cutting tool 94 towards work piece 34.

After the initial set up, cutting means 20 is moved to one end or the other of work piece 34. Then, in-out toggle switch 160 is again operated to advance tracer head 88 toward pattern model 130. As mentioned above, tracer head 88 stays in contact with pattern model 130 due to spring means 190 so that cutting tool 94 actually moves toward work piece 34. Thereafter, left-right toggle switch 158 is actuated in the appropriate direction to move cutting means 20 longitudinally along work piece 34. As shown in FIG. 11, at the high points, cutting tool 94 does not contact work piece 34. However, at the low points, such as low point 198 depicted in FIG. 11, cutting tool 94 does contact work piece 34 as tracer head 88 is at the corresponding low point. A complete traverse of work piece 34 is thus accomplished making an initial cut at the lowest points. Thereafter, in-out toggle switch 160 is again actuated to incrementally move tracer base 86 relative to table 66 and hence move cutting tool 94 a step closer to work piece 34. Upon another traverse of work piece 34 using left-right toggle switch 158, a deeper cut is made at positions which were formerly cut and a new cut is made at slightly higher positions on pattern model 130. This cycle of operation is continued until work piece 34 is cut to match pattern model 130.

It should be appreciated that tracer lathe 10 can also be operated with manual cutting elements if desired. To accomplish this, access to work piece 34 is accessed through hinged door 186 and a normal tool rest is provided mounted to lathe base 12. Conveniently, the tool rest is a safety tool rest such as disclosed in U.S. patent application Ser. No. 485,588 (Larson).

While the present invention has been described with respect to an exemplary embodiment thereof, it will be understood by those of ordinary skill in the art that variations and modifications can be effected within the scope and spirit of the invention.

I claim:

1. A tracer lathe for cutting a work piece comprising:
   a lathe base;
   a work holding means attached to said lathe base for holding the work piece and for rotating the work piece about a longitudinal axis;
   a cutting means attached to said lathe base for cutting the turning work piece, said cutting means including a cutting tool, a cutting holding means for holding said cutting tool, and a cutting base to which said cutting holding means is attached;

a longitudinal moving means operatively connected to said cutting base for cyclically moving said cutting means longitudinally along the work piece; and a lateral moving means operatively connected to said cutting base for moving said cutting means laterally relative to the work piece to bring the cutting means into and out of engagement with the work piece as said cutting means is moved longitudinally by said longitudinal moving means, said lateral moving means including (a) a manual advancing means operatively connected to said cutting base for incrementally advancing said cutting means toward the work piece to an advanced position after a longitudinal movement of said cutting means, (b) a longitudinal pattern to be traced mounted to said lathe base, and (c) an associated mechanical tracer means for tracing said pattern model as said cutting means is moved longitudinally and for moving said cutting means laterally away from the work piece and the advanced position according to said pattern model such that successively deeper or new cuts are made in the work piece according to said pattern model on each longitudinal movement and lateral advance of said cutting means; said mechanical tracer means including a tracer head which is attached to said cutting means and which moves longitudinally with said cutting means while riding along said pattern model, a connection means for moving said cutting means laterally as said tracer head is moved laterally by contact with said pattern model during the longitudinal movement of said tracer head and cutting means, a tracer base on which said tracer head is oriented, and a tracer mounting means for mounting said tracer base for lateral movement on said cutting base; and wherein said manual advancing means includes a manual motor means operatively connected to said tracer base for selectively laterally moving said tracer base relative to said cutting base to move said tracer head relative to said cutting tool and a constant bias spring means for resiliently urging said cutting base toward the work piece until said tracer head engages said pattern model such that said tracer head is resiliently biased against said pattern mode as said tracer head moves longitudinally with said cutting means and the bias on said tracer head does not vary as the separation between said tracer head and said cutting means is changed by said manual advancing means.

2. A tracer lathe as claimed in claim 1 and further including (a) a computer advancing means operatively connected to said cutting base for incrementally advancing said cutting means automatically toward the work piece to an advanced position after a longitudinal movement of said cutting means, and an associated computer tracer means for tracing a computer pattern as said cutting means is moved longitudinally and for moving said cutting means laterally away from the work piece and the advanced position according to the computer pattern such that successively deeper or new cuts are made in the work piece according to the computer pattern on each longitudinal movement and lateral advance of said cutting means, and (b) a selection means operatively connected to said computer and manual advancing means for selecting between said manual advancing means and said computer advancing means;

wherein said lateral moving means includes a cutting mounting means for mounting said cutting base for lateral movement relative to said lathe base; and wherein said computer advancing means includes a computer motor means operatively connected to said cutting base for selectively laterally moving said cutting base relative to said lathe base to move said cutting tool laterally relative to the work piece.

3. A tracer lathe as claimed in claim 2 wherein said lateral moving means includes a programmable computer means mounted on said lathe base for automatically controlling the operation of said computer advancing means and said computer tracer means.

4. A tracer lathe as claimed in claim 3 wherein said computer motor means includes a threaded rod which is rotated by said computer motor means relative to said base, and an engagement means attached to said cutting base for selectively engaging said threaded rod to cause said cutting base to move relative to said base.

5. A tracer lathe as claimed in claim 4 wherein said engagement means is a split nut which is movable into and out of threaded engagement with said threaded rod.

6. A tracer lathe as claimed in claim 3 wherein said lateral moving means includes a handheld remote actuator means for remotely actuating said manual advancing means and said longitudinal moving means.

7. A tracer lathe as claimed in claim 3 and further including a transparent safety shield resting on said lathe base and covering the work piece, said work holding means, said cutting means, said longitudinal moving means, and said lateral moving means.

8. A tracer lathe as claimed in claim 1 wherein said cutting means further includes a cutting pivot means for pivotally mounting said cutting holder means to said cutting base such that said cutting tool is pivotable about an axis parallel to the longitudinal axis of the work piece, and a cutting locking means for locking said cutting tool in a desired pivoted position.

9. A tracer lathe as claimed in claim 1 wherein said cutting means further includes a vacuum means having an inlet disposed adjacent said cutting tool for collecting work piece cuttings and for transporting the work piece cuttings away from the remainder of said cutting means.

10. A tracer lathe as claimed in claim 9 wherein said cutting means further includes a deflector plate positioned adjacent said cutting tool for deflecting work cuttings into said vacuum inlet.

11. A tracer lathe as claimed in claim 9 wherein said cutting means further includes chip guards located above and below said cutting tool to stop flying cuttings cut from the work piece by said cutting tool.

12. A lathe for cutting a work piece comprising:

a lathe base;

a work holding means attached to said lathe base for holding the work piece and for rotating the work piece about a longitudinal axis;

a cutting means attached to said lathe base for cutting the rotating work piece, said cutting means including a cutting tool, a cutting holder means for holding said cutting tool, and a cutting base to which said cutting holding means is attached;

longitudinal moving means operatively connected to said cutting base for cyclically moving said cutting means longitudinally along the work piece; and a lateral moving means operatively connected to said cutting base for moving said cutting means laterally relative to the work piece to bring the cutting means into and out of engagement with the work piece as said cutting means is moved longitudinally by said longitudinal moving means;

said cutting means further including (a) a vacuum means having an inlet disposed adjacent said cutting tool for collecting work piece cuttings and for transporting the work piece cuttings away from the remainder of said cutting means, and (b) a deflector plate positioned adjacent said cutting tool for deflecting work cuttings into said vacuum inlet.

13. A lathe as claimed in claim 12 wherein said lateral moving means includes:

(a) a manual advancing means operatively connected to said cutting base for incrementally advancing said cutting means toward the work piece to an advanced position after a longitudinal movement of said cutting means, a longitudinal pattern model to be traced, and an associated mechanical tracer means for tracing said pattern model as said cutting means is moved longitudinally and for moving said cutting means laterally away from the work piece and the advanced position according to said pattern model such that successively deeper or new cuts are made in the work piece according to said pattern model on each longitudinal movement and lateral advance of said cutting means, (b) a computer advancing means operatively connected to said cutting base for incrementally advancing said cutting means automatically toward the work piece to an advanced position after a longitudinal movement of said cutting means, and an associated computer tracer means for tracing a computer pattern as said cutting means is moved longitudinally and for moving said cutting means laterally away from the work piece and the advanced position according to the computer pattern such that successively deeper or new cuts are made in the work piece according to the computer pattern on each longitudinal movement and lateral advance of said cutting means, and (c) a selection means operatively connected to said computer and manual advancing means for selecting between said manual advancing means and said computer advancing means.

14. A lathe as claimed in claim 13 wherein said mechanical tracer means includes a tracer head which is attached to said cutting means and which moves longitudinally with said cutting means while riding along said pattern model, and a connection means for moving said cutting means laterally as said tracer head is moved laterally by contact with said pattern model during the longitudinal movement of said tracer head and cutting means.

15. A lathe as claimed in claim 14 wherein said manual advancing means moves said tracer head relative to said cutting means.

16. A lathe as claimed in claim 15 wherein said mechanical tracer means further includes a tracer base on which said tracer head is oriented and a tracer mounting means for mounting said tracer base for lateral movement on said cutting base; and wherein said manual advancing means includes a manual motor means for selectively laterally moving said tracer base relative to said cutting base to move said tracer head relative to said cutting tool.

17. A lathe as claimed in claim 16 wherein said manual advancing means includes a spring means for resiliently urging said cutting base toward the work piece until said tracer head engages said pattern model such that said tracer head is resiliently biased against said pattern model as said tracer head moves longitudinally with said cutting means.

18. A lathe as claimed in claim 17 wherein said spring means provides a constant bias on said tracer head which does not vary as the separation between said tracer head and said cutting means is changed by said manual advancing means.

19. A lathe as claimed in claim 16 wherein said lateral moving means includes a cutting mounting means for mouting said cutting base for lateral movement relative to said lathe base; and wherein said computer advancing means includes a computer motor means for selectively laterally moving said cutting base relative to said lathe base to move said cutting tool laterally relative to the work piece.

20. A lathe as claimed in claim 19 wherein said lateral moving means includes a programmable computer means mounted on said lathe base for automatically controlling the operation of said computer advancing means and said computer tracer means.

21. A lathe as claimed in claim 20 wherein said computer motor means includes a threaded rod which is rotated by said computer motor means relative to said base, and an engagement means attached to said cutting base for selectively engaging said threaded rod to cause said cutting base to move relative to said base.

22. A lathe as claimed in claim 21 wherein said engagement means is a split nut which is movable into and out of threaded engagement with said threaded rod.

23. A lathe as claimed in claim 20 wherein said lateral moving means includes a handheld remote actuator means for remotely actuating said manual advancing means and said longitudinal moving means.

24. A lathe as claimed in claim 20 and further including a transparent safety shield resting on said lathe base and covering the work piece, said work holding means, said cutting means, said longitudinal moving means, and said lateral moving means.

25. A lathe as claimed in claim 12 wherein said cutting means further includes a cutting pivot means for pivotally mounting said cutting holder means to said cutting base such that said cutting tool is pivotable about an axis parallel to the longitudinal axis of the work piece, and a cutting locking means for locking said cutting tool in a desired pivoted position.

26. A lathe as claimed in claim 12 wherein said cutting means further includes chip guards located above and below said cutting tool to stop flying cuttings cut from the work piece by said cutting tool.

* * * * *